April 29, 1924.
I. B. PEGUES
STEAMER
Filed Jan. 3. 1923
1,492,083
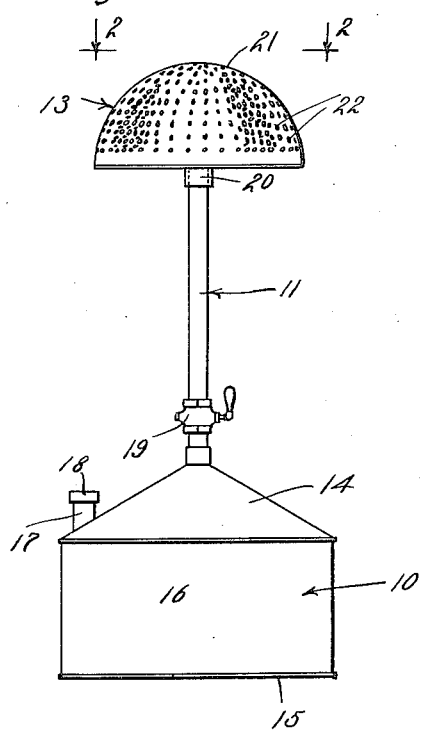
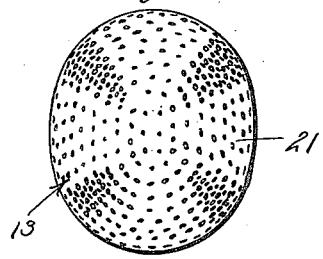
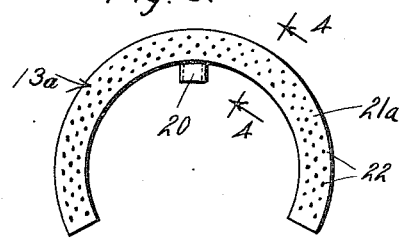
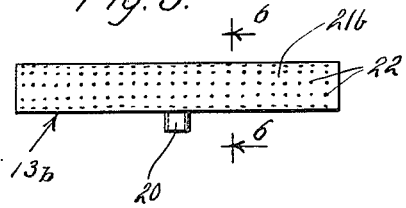
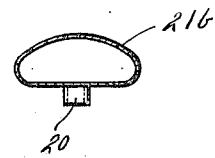
Inventor
Ida Bell Pegues
by Wm. H. Maxwell
her Attorney Patented Apr. 29, 1924.

1,492,083

UNITED STATES PATENT OFFICE.

IDA BELL PEGUES, OF LOS ANGELES, CALIFORNIA.

STEAMER.

Application filed January 3, 1923. Serial No. 610,468.

*To all whom it may concern:*

Be it known that I, IDA BELL PEGUES, a citizen of the United States, a resident of Los Angeles, county of Los Angeles, and State of California, have invented new and useful Improvements in Steamers, of which the following is a full, clear, and accurate disclosure thereof.

This invention has to do with a steamer, and it is an object of the invention to provide a simple effective device for steaming cloth, and the like.

Certain cloths, and like materials, and, particularly, velvets, are steamed for various reasons; for instance, to take creases out of them, to loosen the nap when it has been crushed, to soften them so that they can be stretched or formed in various manners, etc. Heretofore it has been customary, particularly in millinery shops, and like establishments, to steam cloth over the spout of an ordinary kettle, or the like. This practice is, of course, inconvenient, and is not satisfactory, particularly for certain kinds of work.

It is an object of this invention to provide a steamer for cloth, or the like, which is effective, and particularly convenient to use.

Another object of this invention is to provide a steamer of the character specified, which is simple in construction and which can be easily and quickly changed to handle different kinds of work.

The various objects and features of my invention will be best and more fully understood from the following detailed description of a typical preferred form and embodiment of my invention, throughout which reference is had to the accompanying drawings, in which:

Fig. 1 is a view showing the steamer provided by my invention;

Fig. 2 is a plan view of the head of the steamer shown in Fig. 1;

Fig. 3 is a view showing another form of head that may be used on the steamer;

Fig. 4 is a detail sectional view of the head shown in Fig. 3, being a view taken as indicated by line 4—4 on Fig. 3;

Fig. 5 is a view showing another form of head that may be used on the steamer; and Fig. 6 is a detail transverse sectional view of the head, shown in Fig. 5, being a view taken as indicated by the line 6—6 on Fig. 5.

The device provided by this invention includes, generally, a container or steam generator 10; a steam spout 11, and a head 13, removably mounted on the spout 11.

In the particular form of the invention illustrated in the drawings, the generator 10 is of simple design and construction and comprises a top 14, a bottom 15, and a side part 16, which joins the top and bottom. The top 14 is preferably conically shaped, and is provided with a filling spout 17. The filling spout 17 is closed by a suitable removable cap 18.

The steam spout 11 is preferably a straight pipe extending upwardly from the top 14 of the generator, and preferably from the center of the top 14. I provide a suitable valve 19 in the steam spout so that the flow of steam from the generator and through the spout can be suitably controlled.

The head 13 is, in accordance with the present invention, removably mounted on the upper end of the steam spout 11, so that it can be arranged on and removed from the spout, as desired. In the form of construction illustrated in the drawings, the head 13 has a socket 20 which receives the upper end of the steam spout and has a face part 21 shaped and arranged to suit the particular class of work for which the device is to be used. The head 13, which I have illustrated in Figs. 1 and 2 of the drawings, has a dome shaped face 21, and is adapted to be used for blocking or forming hat crowns, or the like. In accordance with the invention, the face 21 is provided with a plurality of comparatively fine openings through which the steam which enters the head from the steam spout 11, issues to steam the material arranged on or moved in contact with the head. In the formation of a hat crown, and in the formation of other similar objects, it is desirable to steam certain parts of the material more than others, so that the material will properly take the desired shape. For instance, when forming a crown of a piece of cloth it is desirable to steam the bias portions of the cloth more than the other portions, so, therefore, in accordance with my invention, I provide openings 22 in the head 21 so that more steam issues from the head at certain parts than at others. In the head illustrated in the drawings, I provide the openings 22 so that a piece of material to be formed may be arranged over it so that the biased portions will be steamed more than the straight portions. It will be obvious, of course, that the openings may be arranged and varied so that a piece of material arranged over the head will be steamed the desired amounts at its various parts. Further, it will be obvious, that the desired variation in the distribution of steam throughout various parts of the face may be controlled by varying the sizes of the openings, the number of openings, or both.

In accordance with my invention I provide the device with several heads 13, variously shaped so that they may be used in steaming or shaping pieces of material of different shapes. In Figs. 3 and 4, I illustrate a head 13ª having a face part 21ª shaped and curved so that it can be advantageously used in steaming or shaping a piece of material to form a brim of a hat, or the like. It will be obvious, of course, that heads 13ª, such as is illustrated in Figs. 3 and 4, may be provided with faces of various radii and of various configurations for the purpose of forming or steaming hat brims of various sizes and shapes.

In Figs. 5 and 6, of the drawings I illustrate a head 13ᵇ having a face 21ᵇ designed and shaped so that it is particularly adapted to have material drawn over it to be steamed.

In the operation of the device provided by my invention, the generator is heated in any suitable manner so that water contained in it is generated into steam, the valve 19 is adjusted so that the desired amount of steam flows out through the steam spout 11, and the desired head 13 is arranged on the upper end of the steam spout. The steam which flows into the head 13 through the steam spout 11 issues from the head through the openings 22. It will be obvious how material may be held or arranged on or passed over the head in a manner to steam or block it, as desired. It will be obvious, of course, that the device may be used without a head if it is desired to use the device in the same manner that an ordinary kettle is used.

From the foregoing description of a typical preferred form of my invention it will be obvious that the various parts may be made of various different materials, and that their design and proportions may be varied to suit requirements. For instance, the proportioning and shaping of the various parts of the device, which I have illustrated in the drawings, may be varied widely without departing from the spirit of my invention.

Having described only a typical preferred form of my invention I do not wish to limit myself to the specific details hereinabove set forth but wish to reserve to myself any changes or variations that may appear to those skilled in the art or fall within the scope of the following claims.

Having described a preferred form of my invention, I claim:

1. A device of the character described including, a steam generator, a spout connected with the generator, and a head mounted on the spout, the head including a face having openings in it to allow steam to escape, the openings varying at different parts of the face so that steam escapes from one part of the face faster than from another.

2. A device of the character described including, a steam generator having a conical shaped top and a filling spout in connection with the top, a steam spout extending upwardly from the center of the top, a valve in the steam spout, and a head adapted to be removably mounted on the upper end of the steam spout, the head including a socket adapted to receive the end of the steam spout and a face having openings in it to allow steam to escape from the head, the openings varying at different parts of the face so that steam escapes from one part of the face faster than from another.

3. In a steaming device, a forming part having openings in it to allow steam to pass through it, the openings varying at different parts of the face so that steam escapes from one part of the forming part faster than from another.

In witness that I claim the foregoing I have hereunto subscribed my name this 26th day of December, 1922.

IDA BELL PEGUES.

Witnesses:
 W. U. MAXWELL,
 IDA L. WESTLAKE.